Patented Oct. 9, 1951

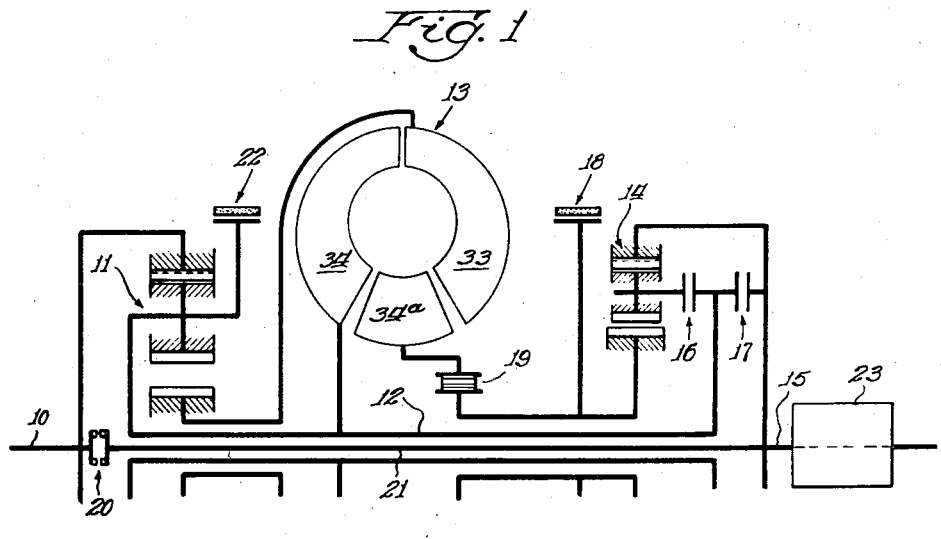
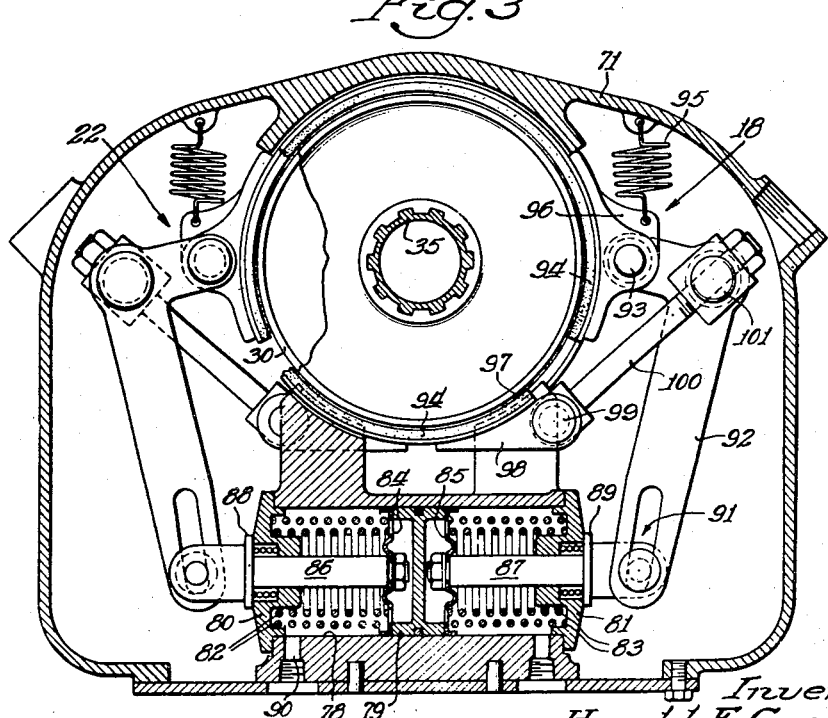

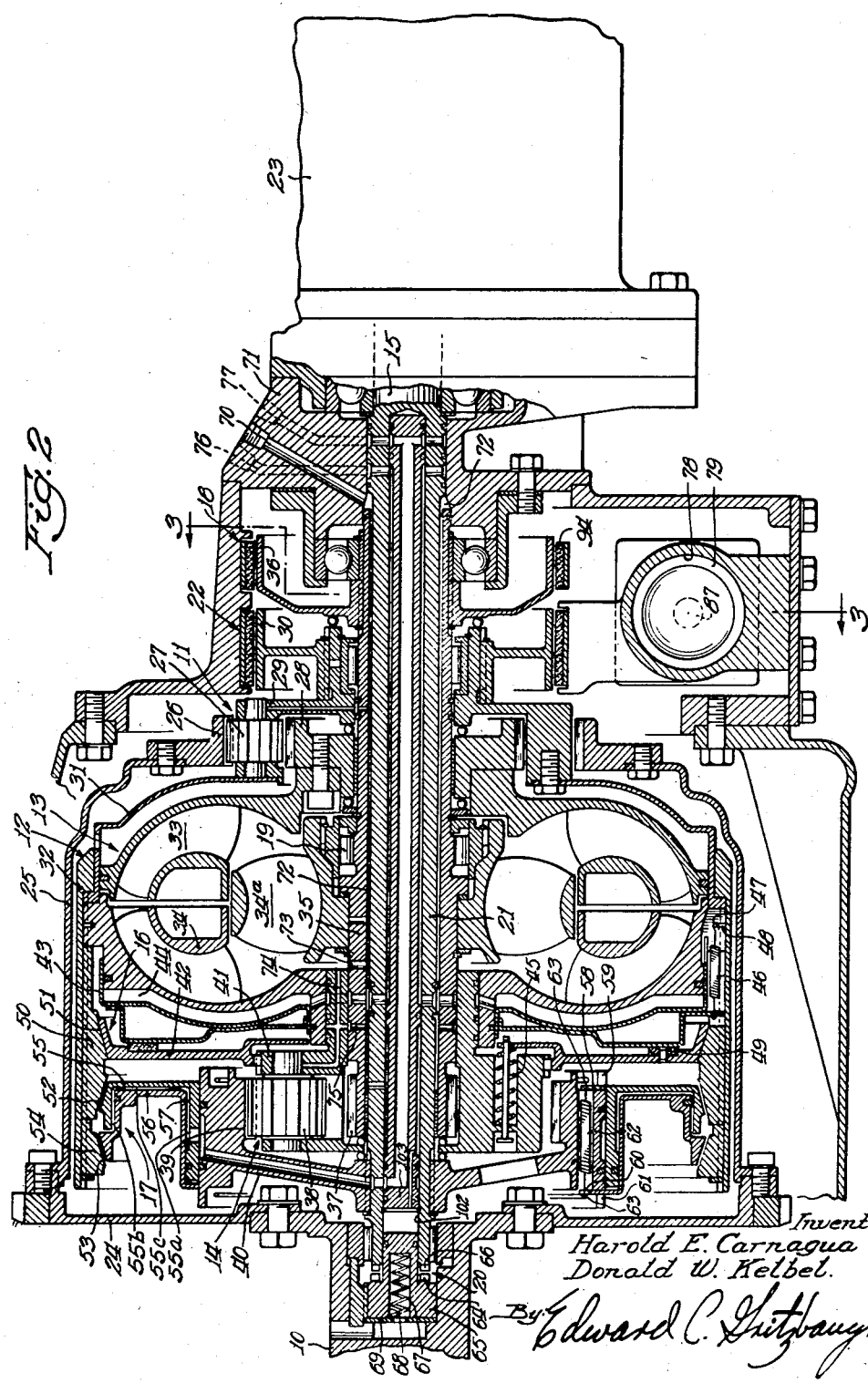

2,570,641

UNITED STATES PATENT OFFICE 2,570,641

SPREADING FLUID CLUTCH

Harold E. Carnagua and Donald W. Kelbel, Muncie, Ind., assignors to Borg-Warner Corporation, Chicago, Ill., a corporation of Illinois Original application December 16, 1943, Serial No. 514,464. Divided and this application October 31, 1946, Serial No. 706,884

1 Claim. (Cl. 192—85)

This invention relates to transmissions and particularly to those which incorporate fluid operated or controlled devices.

It is an object of our invention to provide an improved friction coupling in a transmission and more particularly one which is fluid pressure actuated. It is a more specific object to provide such a coupling which is capable of carrying large loads for its size and to this end it is an object to provide such a coupling having two movable friction members one of which has a piston fitting in a recess formed in the other member, with a fluid connection being provided whereby fluid under pressure can be introduced into the recess and behind the piston for engaging the friction coupling.

It is also an object of this invention to provide an improved arrangement of fluid conduits by means of which such a coupling may be connected through one of the shafts of the transmission with an outside source of fluid pressure. To this end it is an object to provide a hollow shaft which may be the driving or driven shaft of the transmission and on which the friction coupling as well as other fluid actuated devices are mounted, with a hollow plug being inserted in the hollow shaft in order to form a plurality of fluid conduits within the shaft.

This application is a division of our copending application, Serial No. 514,464, which has matured into Patent No. 2,414,359, issued January 14, 1947.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a schematic functional diagram of a transmission embodying the principles of the invention;

Fig. 2 is a longitudinal sectional view of the transmission; and

Fig. 3 is a transverse section through the transmission taken along the line 3—3 of Fig. 2.

Like characters of reference designate like parts in the several views.

Referring now to Fig. 1 for a functional description of the transmission, power from a prime mover, such as an internal combustion engine (not shown) is impressed upon an input shaft 10 which is connected directly to a power splitting differential 11, a portion of the power being transmitted mechanically to an intermediate structure or shaft 12 and the remainder being transmitted to an infinitely variable torque multiplying device such as a vaned-type hydrodynamic torque converter 13, the torque from torque converter 13 being combined in structure 12 with the portion transmitted directly thereto by the power splitting differential 11.

The torque in intermediate structure 12 may be again multiplied by means of planetary gearing 14 to provide a low range operation, or it may be transmitted directly to a driven shaft 15 for high range operation. Whether or not the torque is again multiplied depends upon the operation of friction clutches 16 and 17, friction clutch 16 serving to connect shaft 12 to the planetary gear set to effect a torque multiplication and clutch 17 serving to connect shaft 12 directly to the driven shaft 15 when no torque multiplication is desired.

The reaction for torque multiplication is provided by a brake 18 which has suitable connections to both the torque converter 13 and planetary gear set 14. However, a one-way connection 19 is used between brake 18 and torque converting device 13 so as to permit the entire device 13 to rotate forwardly without effecting any torque multiplication when the fluid conditions therein are propitious for such operation. It is contemplated that brake 18, when once applied for forward drive, will remain applied, and since the connection between brake 18 and planetary gear set 14 is a permanent connection, clutches 16 and 17 are mutually exclusively operable to prevent planetary gear set 14 from being locked up and held in braked position when direct drive is desired.

A direct connection including a ratchet clutch 20 and a shaft 21 is provided between driving and driven shafts 10 and 15 in order to crank the engine by turning driven shaft 15 for a push start. Clutch 20 is automatically engaged when drive shaft 10 is not rotating and is automatically disengaged when the engine is idling.

For reverse drive, a brake 22 is provided which is applied to the turbine element of the vaned torque converter 13 when the reaction element or stator thereof is not held against rotation by brake 18. With clutch 16 engaged and clutch 17 disengaged it will be observed that brake 22 also provides a reaction element for both planetary gear sets 11 and 14 as well as causing the turbine and reaction elements of the torque converter 13 to exchange functions so that the turbine element becomes the stator and the stator element becomes the turbine. The result is a reverse drive in driven shaft 15 through the converter 13 as will be described in detail hereinafter.

When this transmission is used in an automotive vehicle such as a passenger car, for example, it is contemplated that the rear axle ratio in the vehicle will be in the neighborhood of 4.25 to 1 and accordingly an overdrive mechanism 23 may be used between driven shaft 15 and the rear axle to slow down the engine at high vehicle speed.

Referring now to Fig. 2 for a detailed description of the embodiment of the elements described in Fig. 1, drive shaft 10 is connected to power splitting differential 11 by means of a fly-wheel 24 and a drum 25. The power splitting differential 11 is comprised of a ring gear 26 which is secured to drum 25 so as to be rotatable therewith and which meshes with one or more planet gears 27 each of which in turn meshes with another planet gear (not shown). The said other planet gears mesh with a sun gear 28. This form of dual planet gearing is well known in the art and its characteristics need not be described in detail here. Planet pinions 27 are mounted on a carrier 29 which is connected on one side to a brake drum 30 and on the other through a concave disc 31 to an inner drum 32.

Torque converter 13 is comprised of a pump element 33 which is bolted to sun gear 28, a turbine element 34 which is splined to drum 32 and a stator element 34a which is connected by means of the aforementioned one-way coupling device 19 to a shaft 35. A brake drum 36 is splined to the right-hand end (Fig. 2) of shaft 35, said drum constituting the rotatable element of brake 18.

The torque multiplying gear set 14 is comprised of a sun gear 37 which meshes with a group of planetary gears (not shown) which in turn meshes with a second group of planetary gears 38 to form a dual planetary gear set of the type shown at 11 and used as a power splitting device. Said second group of planetary gears 38 meshes with a ring gear 39 which drives output shaft 15 through the web 40. Planet pinions 38 are mounted on a carrier 41 which is splined to the driven element 42 of clutch 16. Said clutch 16 is of the conical type so as to have the greatest capacity for the smallest area of cooperating friction surfaces. The driven element 42 is operated by a piston 43, preferably made of stampings to reduce its rotational inertia, said piston forming a chamber 44 between itself and turbine element 34 into which fluid under pressure may be admitted. The fluid pressure acts in a direction to engage the clutch, and a spring 45, reacting against carrier 41, serves to disengage the clutch.

Piston 43 is retracted by means of a plurality of springs 46 tensioned between the piston and a loop of wire 47 retained in a groove 48 in turbine member 34. Contact between piston 43 and movable element 42 is established by means of a friction facing 49 which is riveted to movable element 42. The fixed element of clutch 16 is comprised of a ring 50 which is also splined to drum 32 and has a conical surface 51 adapted to cooperate with the conical surface on movable element 42, and another conical surface 52 which forms one of the axially fixed friction surfaces of clutch 17.

The connection between ring gear 39 and turbine element 34 as stated previously is effected by means of friction clutch 17. This clutch, in addition to the fixed conical surface 52, is provided with a second and oppositely inclined surface 53 formed in a ring 54 splined to drum 32. Cooperating with surfaces 52 and 53 are movable elements 55 and 56 which are so formed that element 55 provides an annular recess and element 56 constitutes an annular piston operating in said annular recess. The annular recess in element 55 is formed by inner and outer substantially cylindrical surfaces 55a and 55b respectively and a substantially radial surface 55c connecting the surfaces 55a and 55b, and the element 56 is similarly shaped with a piston portion to be slidably disposed in the annular recess. Engagement of the clutch is effected by admitting fluid under pressure into the space 57 formed between the two elements so as to separate said elements, thereby causing the elements to engage surfaces 52 and 53. Element 55 is provided with lugs 58 which extend into a slot 59 in forging 40, and piston 56 is likewise provided with lugs 60 which extend into a slot 61 in forging 40 disposed opposite slot 59. The clutch is maintained in a retracted position by means of a series of springs 62 which are tensioned between a pair of hoops 63 positioned outside of lugs 58 and 60.

Clutch 20, which it will be recalled is used to start the engine from the driven shaft 15, is comprised of a set of ratchet teeth 64 formed in a piston 65 which is keyed to drive shaft 10, and a cooperating set of ratchet teeth 66 formed in the end of shaft 15. Said shaft 15 is bored to receive piston 65. A reclease spring 67 is received in an opening 68 and is compressed against an abutment 69 in shaft 10 to tend to maintain clutch 20 in an engaged condition. Thus whenever fluid pressure behind piston 65 is reduced below the force of the spring 67, clutch 20 will be engaged.

Fluid for disengaging clutch 20, for lubricating portions of the transmission and for filling torque converter 13 is obtained from a suitable source of fluid under pressure such as the engine oil pump and is conducted to a conduit 70 formed in housing 71 and leading to an annular space 72 formed between driven shaft 15 and shaft 35. Said annular space 72 is in communication through a conduit 73 with hydraulic torque converter 13, a conduit 74, a return conduit 75 and the series of conduits and spaces shown in Fig. 2 which eventually reach a space behind piston 65. Fluid for operating clutch 16 is admitted from the same source of fluid under pressure through suitable valving (not shown) to a conduit 76 in casing 71 and connecting conduits and spaces as shown in Fig. 2 to the space 44 behind pistons 43. Fluid under pressure for operating clutch 17 is obtained likewise through suitable valving (not shown) from the same fluid source and conducted through conduit 77 to a series of connected conduits as shown in Fig. 2 to the space 57 behind piston 56.

To simplify the drilling of the driven shaft 15 for the various conduits and passageways, driven shaft 15 is drilled with one continuous bore 102 into which is fitted a long plug 103, the plug being previously formed with portions of reduced diameter and with a central passageway having appropriate openings to the exterior at either end.

Brakes 18 and 22 are shown to advantage in Fig. 3. Said brakes comprise a cylinder 78 formed in housing 71 in which is a double acting piston 79. It will be noted that the cylinder 78 is disposed radially of the brake drums 36 and 30 and off their peripheries. The ends of cylinder 78 are closed off by end plates 80 and 81 and resilient means such as coil springs 82 and 83 are compressed between piston 79 and end plates 80 and 81. The pressure of springs 82 and 83 is not taken directly by piston 79 but by apertured stampings 84 and 85 each of which is anchored to a piston rod 86 and 87 respectively. Said rods are provided with shoulders 88 and 89, respectively, which limit the inward movement of the rods. In order to move one of the rods, for example rod 87, outward, fluid under pressure is admitted through a conduit 90 into the opposite half of cylinder 78 and the fluid then passes through the apertured stamping 84 to piston 79, thereby forcing the piston to the right as viewed in Fig. 3 against stamping 85 to move rod 87 outward. A similar arrangement of parts is used to cause piston rod 86 to be moved to the left as shown in Fig. 3.

The movement of each rod is transmitted to the respective brakes by suitable linkage. As an example of one form of linkage, rod 87 is connected through a pin-and-slot connection 91 to a bell crank 92 which is pivoted at 93 to an anchor block for a brake band 94. Said brake band 94 cooperates with drum 36 of brake 18. A spring 95 tensioned between housing 71 and a lug 96 on band 94 tends to rotate the end secured thereto in a counterclockwise direction as viewed in Fig. 3. The opposite end 97 of brake band 94 is secured to an anchor block 98 which is pivotally connected at 99 to a tension rod 100, said rod being pivoted at its opposite end 101 to bell crank 92. It will be apparent from the arrangement of the various links and anchor blocks that when piston rod 87 is moved to the right as viewed in Fig. 3 the ends of the brake band will be drawn together to effect its tightening about its associated drum, thereby causing the brake to become operative to arrest the rotation of shaft 35. It will also be observed that spring 83 in cylinder 79 and spring 85 will tend to release the brake. A similar arrangement may be used to operate the brake 22.

Details of the overdrive mechanism 23 are not given here since it is contemplated that the overdrive will be of standard design such as has been on the market for many years.

The transmission herein described provides a definite neutral through the disconnection of the turbine element 34 from the planetary gear set 14 and hence when properly controlled the transmission will not creep as is customary in hydrodynamic transmissions which are directly connected to an internal combustion engine. The arrangement of parts is such that although the clutch 16 is required to transmit more than engine torque and hence must be sufficiently large to carry this load it is located adjacent the fly-wheel where ample room is available although functionally it is associated directly with the driven shaft. Clutch 17 which is required to carry only engine torque, is located adjacent clutch 16 and likewise does not unduly increase the size of the transmission. Although both clutches may be engaged abruptly, the torque at all times is transmitted, at least partly, through the torque converter 13 which is inherently a shock absorbing device and hence no excessive shocks will be transmitted to the frame of the vehicle when these clutches are operated.

It will be observed that the operating linkages of brakes 18 and 22 are of the servo type, thus requiring less pressure in the operating cylinders. As the brake bands take hold, they will rock around and lock with a greater force than that applied by the oil pressure alone.

The improved friction coupling 17 is one which carries a great amount of power for the size of the coupling. This, we consider, is due to the tapered friction surfaces and the separable rings 55 and 56 which are separated to engage the friction surfaces. The shaft arrangement providing the fluid conduits from outside of the transmission casing to the friction coupling as well as to the other clutch 16 and the hydrodynamic torque transmitting device 13 is also a very advantageous arrangement.

We wish it to be understood that our invention is not to be limited to the specific constructions and arrangements shown and described, except only insofar as the claims may be so limited, as it will be apparent to those skilled in the art that changes may be made without departing from the principles of the invention.

We claim:

A friction type coupling comprising two members to be frictionally connected, one of said members having a pair of spaced friction surfaces facing each other, the other of said members comprising a hub element and a pair of rings splined thereto so as to float axially thereupon, each of said pair of rings having a friction surface adapted to engage with one of said first named friction surfaces, one of said rings being formed with an annular channel therein having inner and outer substantially cylindrical surfaces facing each other and a substantially radial surface connecting these surfaces, said other ring being provided with an annular piston portion disposed within said channel, a fluid seal carried by said piston portion and in sliding contact with said outer cylindrical surface, a fluid seal carried by said inner cylindrical surface and in sliding contact with said piston portion, said hub being formed with a peripheral groove in communication with a plurality of radial openings through said inner cylindrical surface, a pair of fluid seals carried by said hub element on either side of said peripheral groove for sealingly connecting said hub element and said inner cylindrical surface, means for introducing fluid under pressure into said peripheral groove, radial openings and channel to separate said rings for engaging the friction surfaces thereon with said first-named friction surfaces, and spring means between said rings for yieldingly holding the rings in their disengaged positions.

HAROLD E. CARNAGUA.
DONALD W. KELBEL.

REFERENCES CITED

The following references are of record in the file of this patent:

UNITED STATES PATENTS

| Number | Name | Date |
|---|---|---|
| 796,989 | Enrico | Aug. 15, 1905 |
| 847,575 | Hanson | Mar. 19, 1907 |
| 1,475,020 | Mayer | Nov. 20, 1923 |
| 1,953,568 | Rose | Apr. 3, 1934 |
| 2,064,553 | Mack | Dec. 15, 1936 |
| 2,136,806 | Seeley | Nov. 15, 1938 |
| 2,136,971 | Fleischel | Nov. 15, 1938 |
| 2,211,233 | Kelley | Aug. 13, 1940 |
| 2,273,345 | Burrell | Feb. 17, 1942 |
| 2,291,241 | Lawrence | July 28, 1942 |
| 2,300,865 | Berger | Nov. 3, 1942 |
| 2,361,120 | Peterson | Oct. 24, 1944 |
| 2,414,359 | Carnagua et al. | Jan. 14, 1947 |

FOREIGN PATENTS

| Number | Country | Date |
|---|---|---|
| 117,487 | Australia | Sept. 23, 1943 |
| 487,959 | Germany | Dec. 17, 1929 |